United States Patent
Chien

(10) Patent No.: US 8,710,911 B2
(45) Date of Patent: Apr. 29, 2014

(54) CHARGE PUMP CIRCUIT AND POWER-SUPPLY METHOD FOR DYNAMICALLY ADJUSTING OUTPUT VOLTAGE

(71) Applicant: Realtek Semiconductor Corp., HsinChu (TW)

(72) Inventor: Chih-Kang Chien, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 13/716,600

(22) Filed: Dec. 17, 2012

(65) Prior Publication Data
US 2013/0162337 A1 Jun. 27, 2013

(30) Foreign Application Priority Data

Dec. 23, 2011 (TW) .............................. 100148406 A

(51) Int. Cl.
*G05F 1/10* (2006.01)
*H02M 3/07* (2006.01)

(52) U.S. Cl.
CPC ..................................... *H02M 3/073* (2013.01)
USPC ........................................................... 327/536

(58) Field of Classification Search
USPC ........................ 327/530, 534–537; 363/59, 60
See application file for complete search history.

(56) References Cited

U.S. PATENT DOCUMENTS

| | | | | |
|---|---|---|---|---|
| 2006/0197583 A1* | 9/2006 | Yen et al. | ........................ | 327/536 |
| 2009/0039947 A1* | 2/2009 | Williams | ........................ | 327/536 |

* cited by examiner

*Primary Examiner* — Sibin Chen
(74) *Attorney, Agent, or Firm* — Rabin & Berdo, P.C.

(57) ABSTRACT

A charge pump circuit and power-supply method for dynamically adjusting output voltage is related to the charge pump circuit having three power-supply modes with different power conversion efficiencies. When supplying power, a pump unit controls the electrical connecting relations of a first flying capacitor, second flying capacitor, first storage capacitor and second storage capacitor through a first clock and second clock with non-overlapping working phases, to convert a source voltage into a positive output voltage and negative output voltage, thereby providing one of the three power-supply modes.

12 Claims, 12 Drawing Sheets

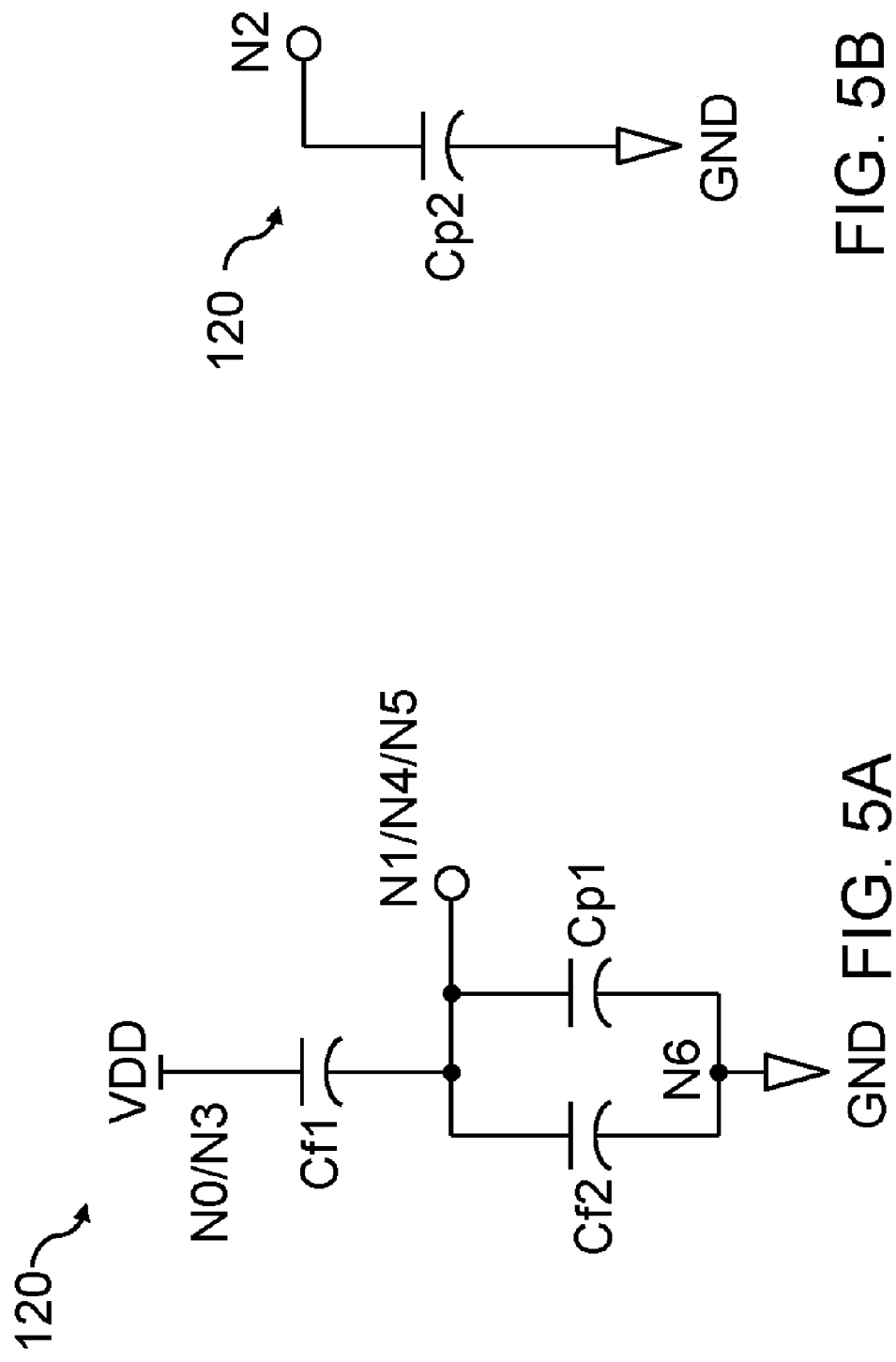

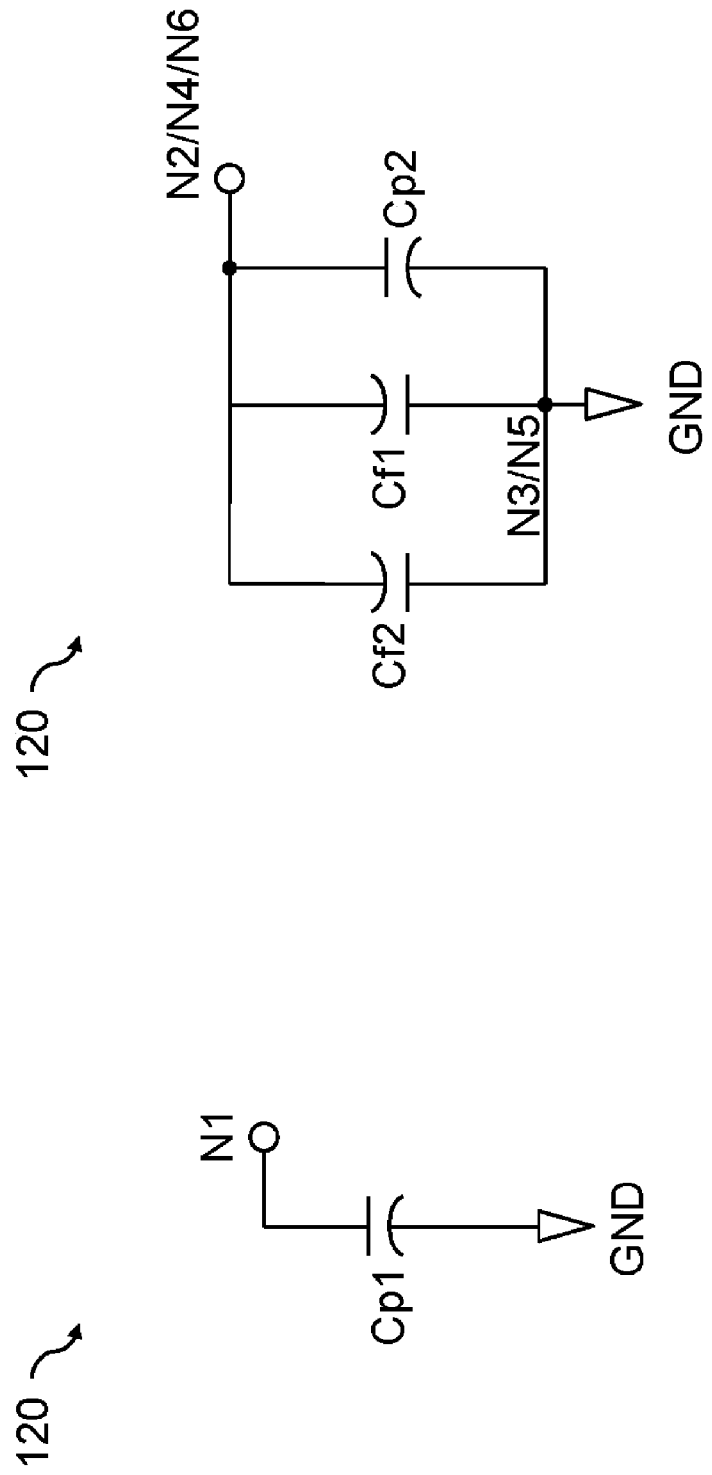

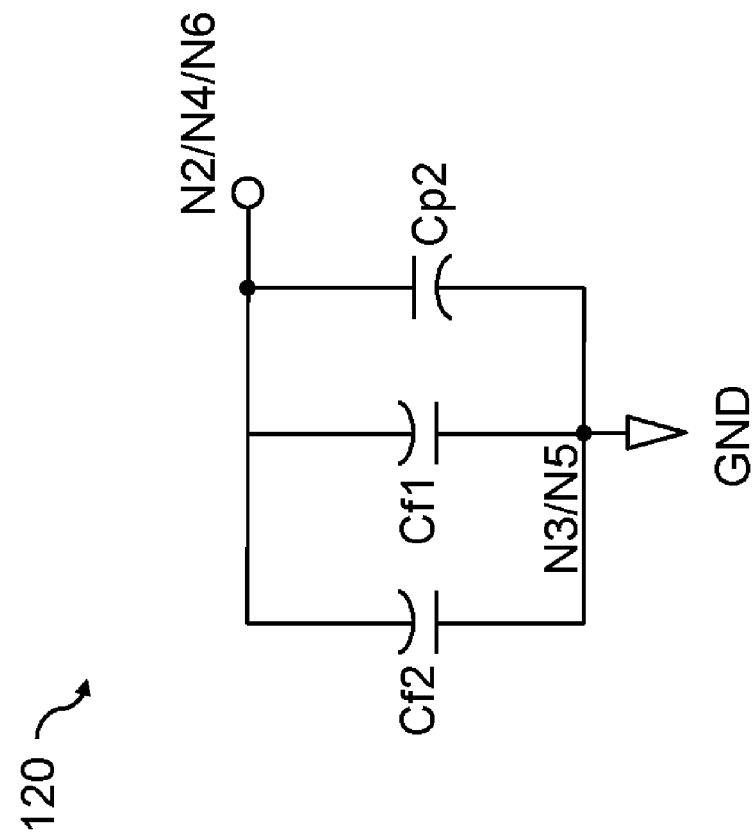
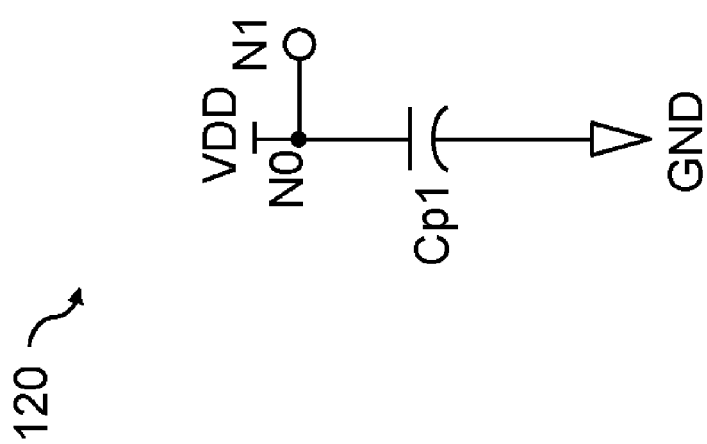
FIG. 9B
FIG. 9A

US 8,710,911 B2

CHARGE PUMP CIRCUIT AND POWER-SUPPLY METHOD FOR DYNAMICALLY ADJUSTING OUTPUT VOLTAGE

CROSS-REFERENCES TO RELATED APPLICATIONS

This non-provisional application claims priority under 35 U.S.C. §119(a) on Patent Application No. 100148406 filed in Taiwan, R.O.C. on Dec. 23, 2011 the entire contents of which are hereby incorporated by reference.

BACKGROUND

1. Technical Field

The disclosure relates to a charge pump circuit and relevant method thereof, and more particularly to a charge pump circuit with adjustable output voltage and a power-supply method for dynamically adjusting output voltage.

2. Related Art

A charge pump circuit is usually applied to the driving circuit in every type of electrical product. The charge pump circuit processes voltage conversion using the charging and discharging characteristics of the capacitors to provide desired output voltage.

FIG. 1 is an explanatory diagram of a charge pump circuit. Referring to FIG. 1, a charge pump circuit 10 includes an electric charge pump unit 12, a flying capacitor Cf, a first storage capacitor Cp1 and a second storage capacitor Cp2.

The electric charge pump unit 12 charges and discharges the flying capacitor Cf, the first storage capacitor Cp1 and the second storage capacitor Cp2 according to a charge pump clock CKp, so as to convert an inputted source voltage VDD into a desired positive output voltage VPP and a negative output voltage VEE. The difference between the positive output voltage VPP and the negative output voltage VEE is usually several times (such as two times) the source voltage VDD, and the conversion is processed in constant and single-mode.

Regarding to the power supply planning for the whole coding/decoding chip (CODEC IC), aside from driving devices of speakers that required higher output Watts, driving devices of headphones consume much power as well. In many designs for the driving devices of the headphones, the charge pump circuits are used to generate a steady negative voltage (−VDD) to supply an amplifier circuit. Although expensive coupling capacitors in the driving end of the headphone is saved, there is still the problem of a high power-consumption problem. In these designs, the positive power end of the amplifier circuit is usually connected to a voltage source of the system (providing the source voltage VDD), while the negative power end is coupled to the charge pump circuit. Therefore, all the static power consumption of the amplifier circuit flows from the positive power end (VDD) to the negative power end (−VDD), rather than to the ground end of the system. The current flowing to the negative power end is counteracted through the charge pump circuit consuming the same current, such that the whole circuit framework must use twice as much power. Furthermore, when considering the power conversion efficiency of the charge pump circuit itself, the total power consumption will further increase.

In addition, when the amplifier drives a device, such as a headphone, regardless of the amplitude of the output signal, the charge pump circuit still generates the negative voltage (−VDD) with a fixed value. Since the audio signal amplitude to headphone is usually much less than the VDD value, it would result in poor efficiency of the entire circuit framework during the low output power operation.

SUMMARY

Accordingly, a charge pump circuit and power-supply method for dynamically adjusting output voltage is provided to reduce the power consumption of a driving device for a headphone and enhance the power efficiency; however, the disclosure is not limited thereto.

In some embodiments, a charge pump circuit includes a power receiving end, a ground end, a positive output end, a negative output end, a first storage capacitor, a second storage capacitor, a first flying capacitor, a second flying capacitor and a pump unit.

The first storage capacitor is coupled between a positive output end and the ground end. The second storage capacitor is coupled between a negative output end and the ground end. The pump unit is coupled to the power receiving end, the ground end, the positive output end, the negative output end, the first flying capacitor and the second flying capacitor.

When supplying the power, the pump unit controls the electrical connection relation of the first flying capacitor, the second flying capacitor, the first storage capacitor, and the second storage capacitor according to a first clock and a second clock with non-overlapping working phases, to convert a source voltage received by the power receiving end into a positive output voltage and a negative output voltage, thereby providing one of a first power-supply mode, a second power-supply mode and a third power-supply mode with different power conversion efficiencies. The positive output end and the negative output end output the positive output voltage and the negative output voltage to a post-stage circuit.

In some embodiments, a power-supply method for dynamically adjusting output voltage includes receiving a source voltage; selecting one of a first power-supply mode, a second power-supply mode and a third power-supply mode with different power conversion efficiencies according to an amplitude of an input signal; controlling at least a connection relation according to a first clock and a second clock with non-overlapping working phases, to convert the source voltage into a positive output voltage and a negative output voltage corresponding to the selected power-supply mode for supplying to a post-stage circuit received the input signal.

BRIEF DESCRIPTION OF THE DRAWINGS

The disclosure will become more fully understood from the detailed description given herein below for illustration only, and thus not limitative of the present invention, wherein:

FIG. 5A and FIG. 5B are explanatory diagrams of an embodiment of a first equivalent circuit of the pump unit shown in FIG. 4A in a first power-supply mode or a second power-supply mode;

FIG. 7A and FIG. 7B are explanatory diagrams of an embodiment of a second equivalent circuit of the pump unit shown in FIG. 4A in the second power-supply mode;

FIG. 9A and FIG. 9B are explanatory diagrams of an embodiment of a second equivalent circuit of the pump unit shown in FIG. 4A in the third power-supply mode;

DETAILED DESCRIPTION

Figure 1:
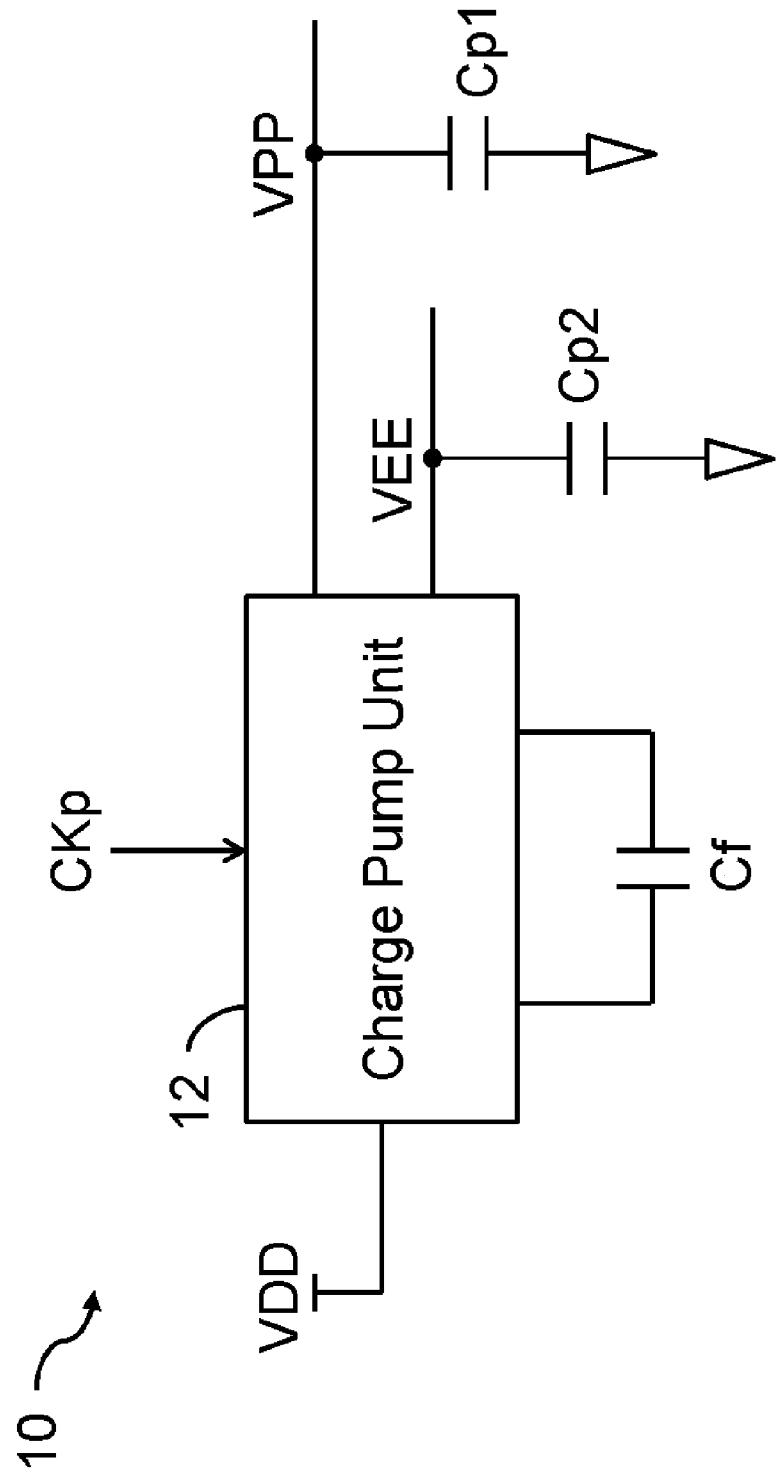
FIG. 1 is an explanatory diagram of a typical charge pump circuit of the prior art.
Figure 2:
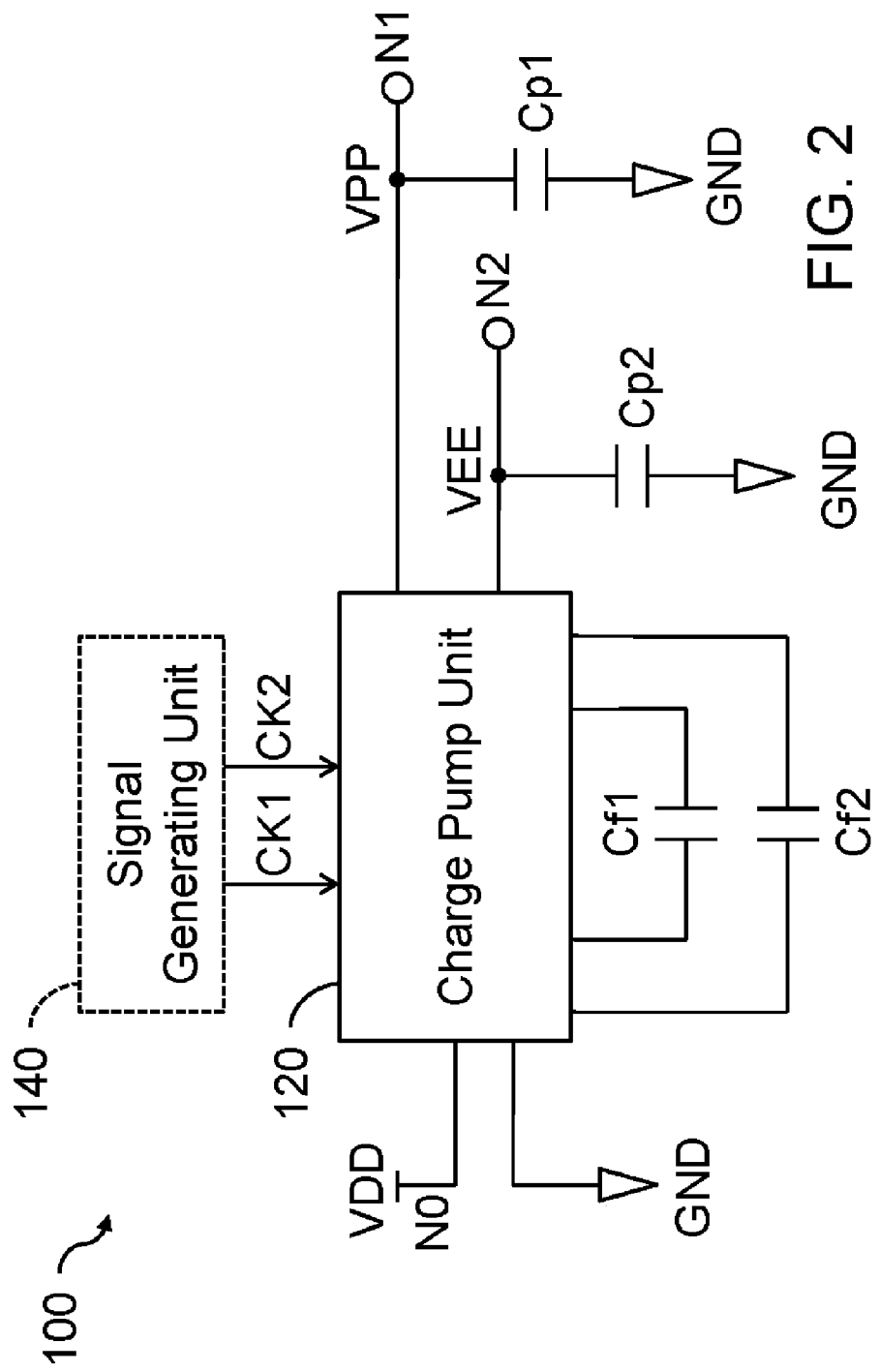
FIG. 2 is an explanatory diagram of a charge pump circuit according to an embodiment of the invention.

FIG. 2 is an explanatory diagram of a charge pump circuit according to an embodiment of the invention.

Figure 3:
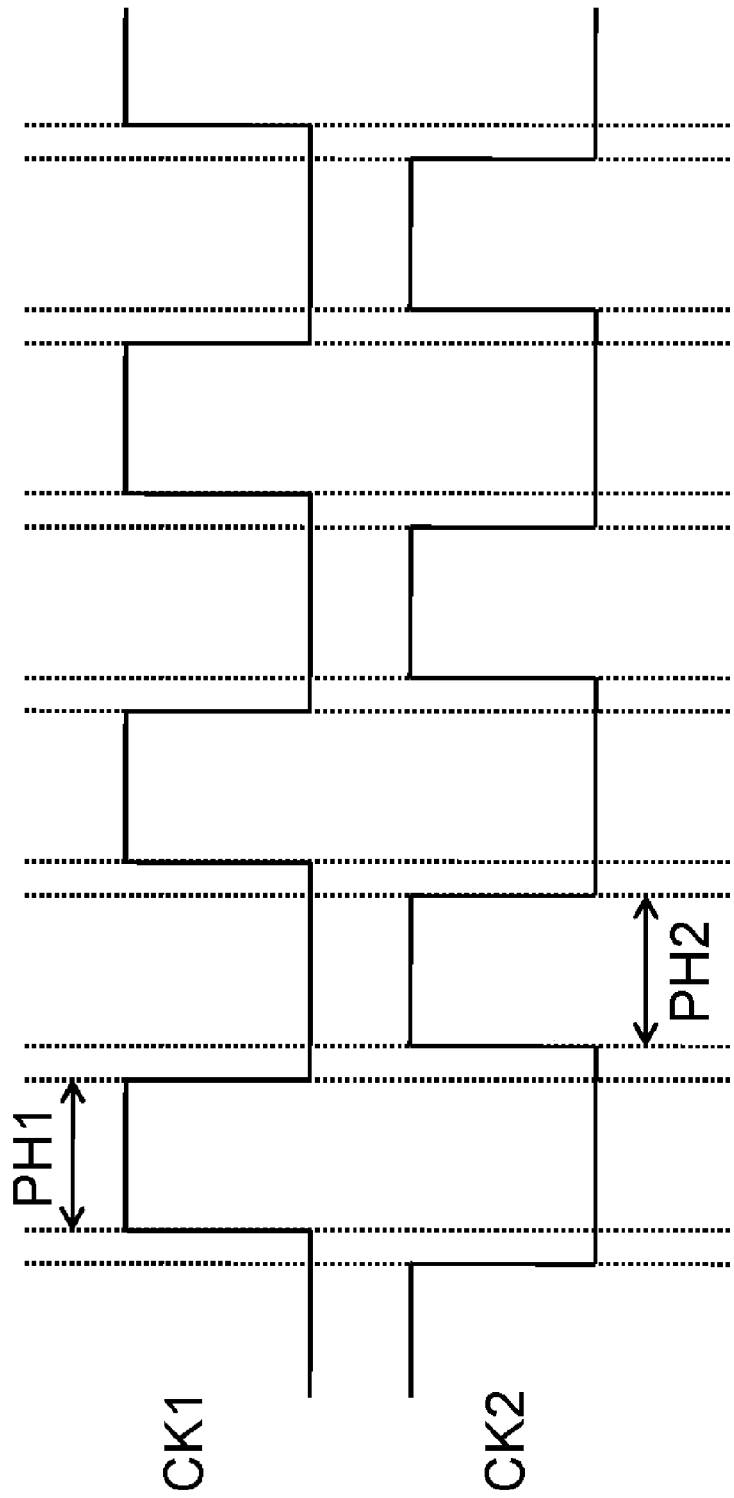
FIG. 3 is a clock diagram of the embodiments of a first clock and a second clock in accordance with the invention.

Referring to FIG. 2, a charge pump circuit 100 is used to convert an inputted source voltage VDD into a positive output voltage VPP and a negative output voltage VEE according to a first clock CK1 and a second clock CK2. The working phases PH1 of the first clock CK1 do not overlap with the working phases PH2 of the second clock CK2, as shown in FIG. 3.

The charge pump circuit 100 has three power-supply modes. In the three power-supply modes, the charge pump circuit 100 has different power conversion efficiencies. Explicitly, in the three power-supply modes, the relative values of the positive output voltage VPP and negative output voltage VEE outputted by the charge pump circuit 100 to the source voltage VDD are different. In the three power-supply modes, the charge pump circuit 100 respectively generates three output voltages (i.e. the voltage difference between the positive output voltage VPP and negative output voltage VEE) with different times the value of the source voltage VDD. For example, in the three power-supply modes, the charge pump circuit 100 respectively generates three output voltages with 2 times (±VDD), 1 times (±½ VDD), and ⅔ times (±⅓ VDD) the value of the source voltage VDD. Consequently, the charge pump circuit 100 has the capability of appropriately selecting the power-supply mode according to the power required by a post-stage circuit. The post-stage circuit is a target circuit powered by the charge pump circuit 100, and the power for the post-stage circuit is in response to the amplitude of the input signal or output signal of the post-stage circuit during a predetermined time.

For clear description, the three power-supply modes are hereafter called the first power-supply mode, the second power-supply mode and third power-supply mode, respectively.

The charge pump circuit 100 includes a power receiving end N0, a ground end GND, a positive output end N1, a negative output end N2, a first storage capacitor Cp1, a second storage capacitor Cp2, a first flying capacitor Cf1, a second flying capacitor Cf2 and a pump unit 120.

The power receiving end N0 is electrically connected to a voltage source of a system, and receives the source voltage VDD from the voltage source. The ground end GND is electrically connected to a ground of the system.

The first storage capacitor Cp1 is coupled between the positive output end N1 and the ground end GND, and the second storage capacitor Cp2 is coupled between the negative output end N2 and the ground end GND.

The pump unit 120 is coupled to the power receiving end N0, the ground end GND, the positive output end N1, the negative output end N2, the first flying capacitor Cf1 and the second flying capacitor Cf2.

When supplying power, the charge pump circuit 100 selects among the first power-supply mode, the second power-supply mode or the third power-supply mode as the executed power-supply mode according to the input or output of the post-stage circuit. The pump unit 120 operates based on the selected power-supply mode; Explicitly controls the connection relation of the power receiving end, the ground end GND, the positive output end N1, the negative output end N2, the positive electrode of the first flying capacitor Cf1, the negative electrode of the first flying capacitor Cf1, the positive electrode of the second flying capacitor Cf2 and the negative electrode of the second flying capacitor Cf2 according to the first clock CK1 and the second clock CK2, thereby converting the inputted source voltage VDD into the positive output voltage VPP and the negative output voltage VEE corresponding to the selected power-supply mode through utilizing the first storage capacitor Cp1, the second storage capacitor Cp2, the first flying capacitor Cf1 and the second flying capacitor Cf2.

In other words, the two ends (the positive and negative electrodes) of the first flying capacitor Cf1 and the two ends (the positive and negative electrodes) of the second flying capacitor Cf2 are coupled to the pump unit 120. When supplying power, according to the executed power-supply mode (the selection from the first power-supply mode, second power-supply mode or third power-supply mode), the pump unit 120 alternately changes the connection relation of the power receiving end, the ground end GND, the positive output end N1, the negative output end N2, the positive electrode of the first flying capacitor Cf1, the negative electrode of the first flying capacitor Cf1, the positive electrode of the second flying capacitor Cf2 and the negative electrode of the second flying capacitor Cf2 in response to the working phases PH1 of the first clock CK1 and the working phases PH2 of the second clock CK2.

The charge pump circuit 100 outputs the positive output voltage VPP converted from the source voltage VDD via the positive output end N1 thereof, and outputs the negative output voltage VEE converted from the source voltage VDD via the negative output end N2 thereof, thereby supplying the post-stage circuit (e.g. amplifier circuit) with the required power for the operation. Moreover, the first storage capacitor Cp1 and the second storage capacitor Cp2 have the capabilities of acting as bulk capacitors for the positive output voltage VPP and the negative output voltage VEE, respectively.

In some embodiments, the first clock CK1 and the second clock CK2 are generated by a signal generating unit 140. Since the practical structure and operating principles of the signal generating unit 140 should be well-known to the person skilled in the art, no explanation is further given herein.

Figure 4A:
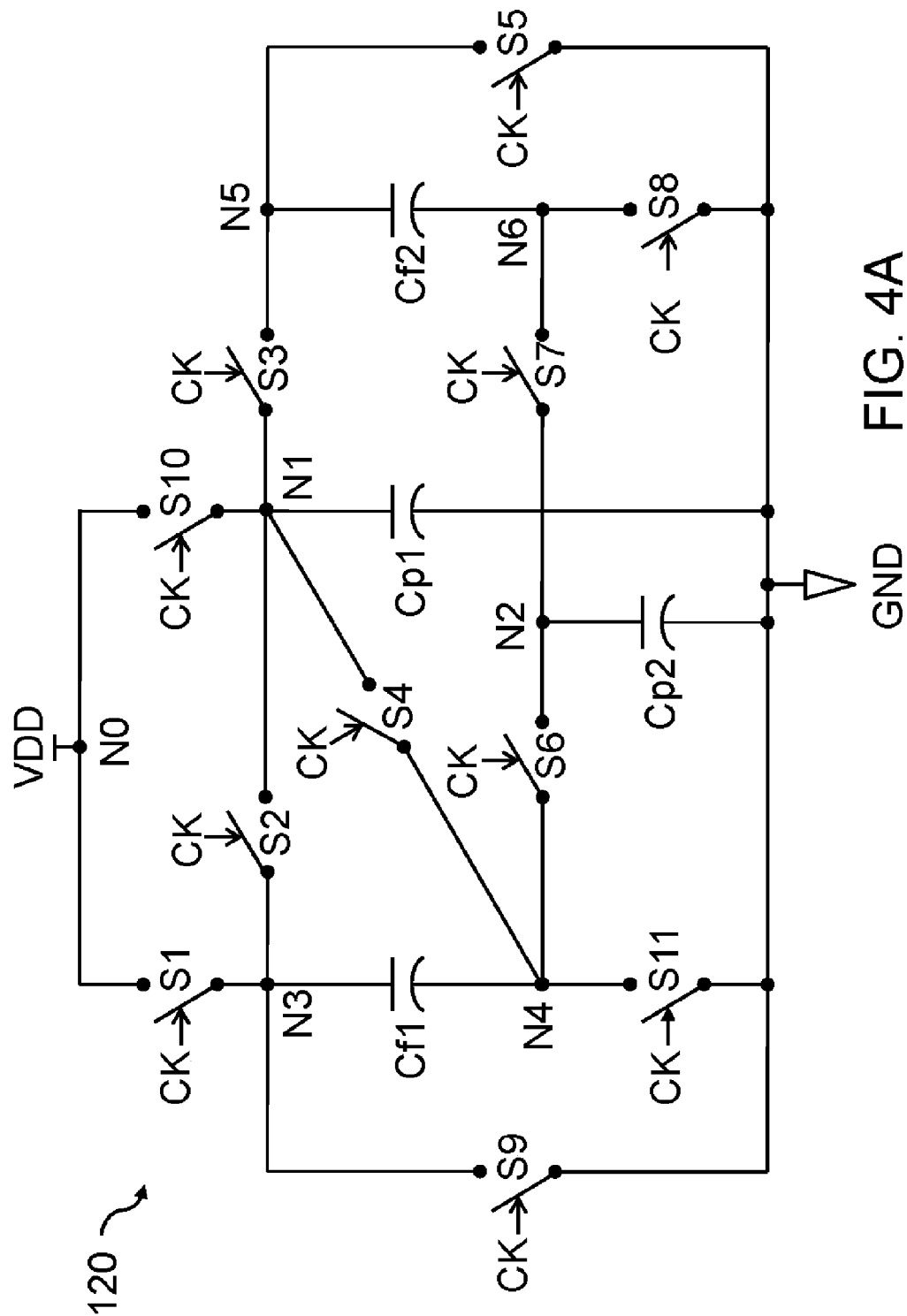
FIG. 4A and FIG. 4B are explanatory diagrams of an embodiment of a pump unit in accordance with the invention.
Figure 4B:
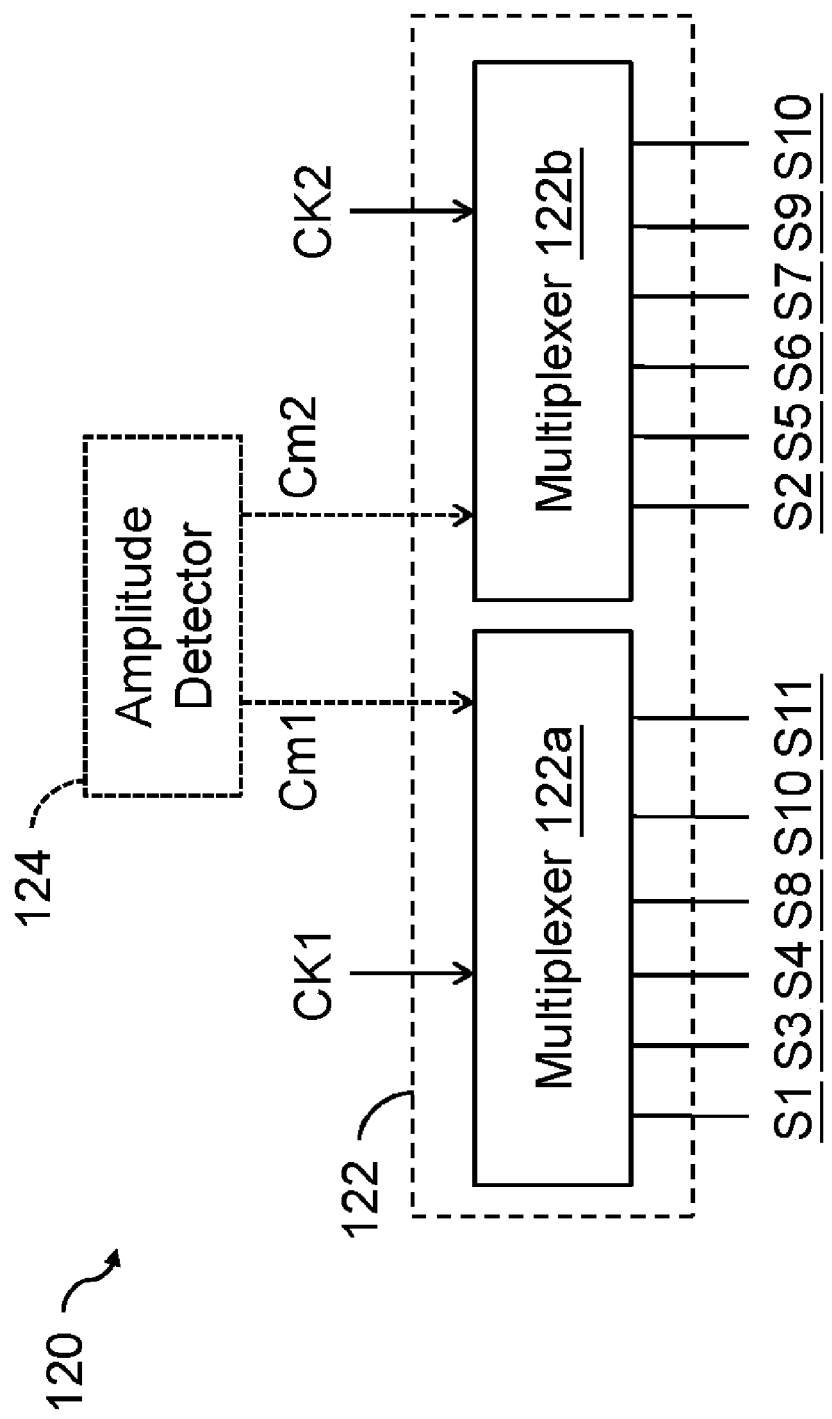

FIGS. 4A and 4B are explanatory diagrams showing a pump unit 120 according to an embodiment.

As described above and referring to FIG. 4A, in some embodiments, the pump unit 120 includes several switches (as those referring to S1~S11 in the drawing). In FIG. 4A, the mark "CK" indicates at least one of the first clock CK1 and the second clock CK2.

Each of the switches is connected between any two of the power receiving end N0, the ground end GND, the positive output end, the negative output end, the positive electrode of the first flying capacitor Cf1, the negative electrode of the first flying capacitor Cf1, the positive electrode of the second flying capacitor Cf2 and the negative electrode of the second flying capacitor Cf2.

As described above and referring to FIG. 4B, in some embodiments, the pump unit 120 further includes a multiplex circuit 122.

The multiplex circuit 122 is coupled to each of the switches (e.g. first switch S1~eleventh switch S11) and the signal generating unit 140.

When the charge pump circuit 100 operates, corresponding to the executed power-supply mode for the pump unit 120 (the charge pump circuit 100), the multiplex circuit 122 inputs the first clock CK1 into a control end of at least one of the switches, and inputs the second clock CK2 into a control end of at least one of the switches.

In some embodiments, the multiplex circuit 122 includes a multiplexer 122a and a multiplexer 122b.

The input end of the multiplexer 122a is coupled to the signal generating unit 140, and the output end thereof is coupled to one or more of the switches (as those referring to S1, S3, S4, S8, S10 or S11 in the drawing).

The multiplexer 122a receives the first clock CK1, and communicates the input end thereof with at least an output end thereof in accordance with the selected power-supply mode, such that the first clock CK1 is transmitted to the corresponding switch via each communicated output end thereof. That is, the Multiplexer 122a turns on the electrical path between the input end thereof and at least an output end thereof in accordance with the selected power-supply mode.

The input end of the multiplexer 122b is coupled to the signal generating unit 140, and the output end thereof is coupled to one or more switches (as those referring to S2, S5, S6, S7, S9 or S10 in the drawing).

Multiplexer 122b receives the second clock CK2, and communicates the input end thereof with at least an output end thereof in accordance with the selected power-supply mode, such that the second clock CK2 is transmitted to the corresponding switch via each communicated output end thereof. That is, the Multiplexer 122b turns on the electrical path between the input end thereof and at least an output end thereof in accordance with the selected power-supply mode.

In some embodiments, the pump unit 120 further includes an amplitude detector 124.

The amplitude detector 124 is coupled to the multiplex circuit 122, and electrically connected to the input end or output end of the post-stage circuit. The power ends of the post-stage circuit are coupled to the positive output end N1 and the negative output end N2. Therefore, the post-stage circuit is powered with the positive output voltage VPP and the negative output voltage VEE, or the input signal inputted into the post-stage circuit is drove by the positive output voltage VPP and the negative output voltage VEE.

The amplitude detector 124 determines the power-supply mode executed by the pump unit 120 (the charge pump circuit 100) according to the amplitude of the input signal or output signal of the post-stage circuit during a predetermined time.

In some embodiment, the amplitude detector 124 outputs corresponding control signals Cm1, Cm2 representing the power-supply mode corresponding to the detected amplitude into the multiplexer 122a and the multiplexer 122b of the multiplex circuit 122 according to the detected amplitude. Multiplexer 122a communicates the input end thereof with the corresponding output end thereof in response to the received control signal Cm1, such that the first clock CK1 is transmitted to the corresponding switch through internal conducting path(s). Multiplexer 122b communicates the input end thereof with the corresponding output end thereof in response to the received control signal Cm1, such that the second clock CK2 is transmitted to the corresponding switch through internal conducting path(s).

Please referring to FIG. 4A again, the switches include the first switch S1, the second switch S2, the third switch S3, the fourth switch S4, the fifth switch S5, the sixth switch S6, the seventh switch S7, the eighth switch S8, the ninth switch S9, the tenth switch S10 and the eleventh switch S11.

The two ends of the first switch S1 are electrically connected (or coupled) to the power receiving end N0 and the positive electrode of the first flying capacitor Cf1 (Node N3), respectively.

The two ends of the second switch S2 are electrically connected (or coupled) to the positive output end N1 and the positive electrode of the first flying capacitor Cf1 (Node N3), respectively.

The two ends of third switch S3 are electrically connected (or coupled) to the positive output end N1 and the positive electrode of the second flying capacitor Cf2 (Node N5), respectively.

The two ends of fourth switch S4 are electrically connected (or coupled) to the positive output end N1 and the negative electrode of the first flying capacitor Cf1 (Node N4), respectively.

The two ends of fifth switch S5 are electrically connected (or coupled) to the ground end GND and the positive electrode of the second flying capacitor Cf2 (Node N5), respectively.

The sixth switch S6 are coupled between the negative output end N2 and the negative electrode of the first flying capacitor Cf1 (Node N4). Explicitly, the two ends of the sixth switch S6 are electrically connected to the negative output end N2 and the negative electrode of the first flying capacitor Cf1 (Node N4), respectively.

The two ends of seventh switch S7 are electrically connected (or coupled) to the negative output end (Node N2) and the negative electrode of the second flying capacitor Cf2 (Node N6), respectively.

The two ends of eighth switch S8 are electrically connected (or coupled) to the ground end GND and the negative electrode of the second flying capacitor Cf2 (Node N6), respectively.

The two ends of ninth switch S9 are electrically connected (or coupled) to the ground end GND and the positive electrode of the first flying capacitor Cf1 (Node N3), respectively.

The two ends of tenth switch S10 are electrically connected (or coupled) to the power receiving end N0 and the positive output end N1, respectively.

The two ends of eleventh switch S11 are electrically connected (or coupled) to the ground end GND and the negative electrode of the first flying capacitor Cf1 (Node N4), respectively.

In some embodiments, all switches from the first switch S1 to the eleventh switch S11 can be implemented by power switches.

In some embodiments, the first power-supply mode, second power-supply mode and the third power-supply mode may be defined as a low power-supply mode, middle power-supply mode and high power-supply mode, respectively.

In some embodiments, please referring to FIGS. 4A and 4B, in the first power-supply mode, the amplitude detector 124 controls the multiplexer 122a of the multiplex circuit 122 to transmit the first clock CK1 to the control ends of the first, third, fourth and eighth switches S1, S3, S4, S8. Moreover, the amplitude detector 124 controls the multiplexer 122b of the multiplex circuit 122 to transmit the second clock CK2 to the control ends of the second, fifth, sixth and seventh switch S2, S5, S6, S7. The control ends of the ninth, tenth and eleventh switch S9, S10, S11 do not receive any control signal, such that the ninth to eleventh switches S9-S11 are off. Explicitly, in the first power-supply mode, the first to eighth switches S1-S8 operate, while switches S9-S11 are not operated.

Therefore, the first, third, fourth and eighth switches S1, S3, S4, and S8 are on, in response to the working phases PH1 of the first clock CK1, so that the electrical connection relation of the power receiving end N0, the ground end GND, the positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5), and the negative electrode of the second flying capacitor Cf2 (Node N6) form a first equivalent circuit, as shown in FIGS. 5A and 5B.

Please referring to FIGS. 5A and 5B, during the working phases PH1 of the first clock CK1, the first flying capacitor Cf1 is positively coupled between the power receiving end N0 and the positive output end N1, and the second flying capacitor Cf2 and the first storage capacitor Cp1 are positively connected in parallel between the positive output end N1 and the ground end GND. Explicitly, the positive electrode of the first flying capacitor Cf1 (Node N3) is coupled to the power receiving end N0, and the negative electrode of the first flying capacitor Cf1 (Node N4) is coupled to the positive output end N1. The positive electrode of the second flying capacitor Cf2 (Node N5) is coupled to the positive output end N1, and the negative electrode of the second flying capacitor Cf2 (Node N6) is coupled to the ground end GND. At this moment, the negative output end N2 is only directly coupled to the second storage capacitor Cp2 toward the inside of the charge pump circuit 100. That is, among the power receiving end N0, the ground end GND, the positive output end N1, the first storage capacitor Cp1, the second a storage capacitor Cp2, the first flying capacitor Cf1, the second flying capacitor Cf2 and the first to eleventh switches S1-S11, only the second storage capacitor Cp2 is directly coupled to the negative output end N2.

In the first equivalent circuit under the first power-supply mode, the voltage Vcf2 across the second flying capacitor Cf2 and the voltage Vcp1 across the first storage capacitor Cp1 are equivalent to the terminal voltage of the positive output end N1 (i.e. the positive output voltage VPP). The voltage Vcf1 across the first flying capacitor Cf1 is the source voltage VDD minus the terminal voltage of the positive output end N1 (i.e. the positive output voltage VPP). In addition, the second storage capacitor Cp2 is floating connected between the negative output end N2 and the ground end GND.

Consequently, the following Formula 1 and Formula 2 are obtained.

$$Vcf1 = VDD - VPP \quad \text{Formula 1}$$

$$Vcf2 = VPP \quad \text{Formula 2}$$

Figure 6:
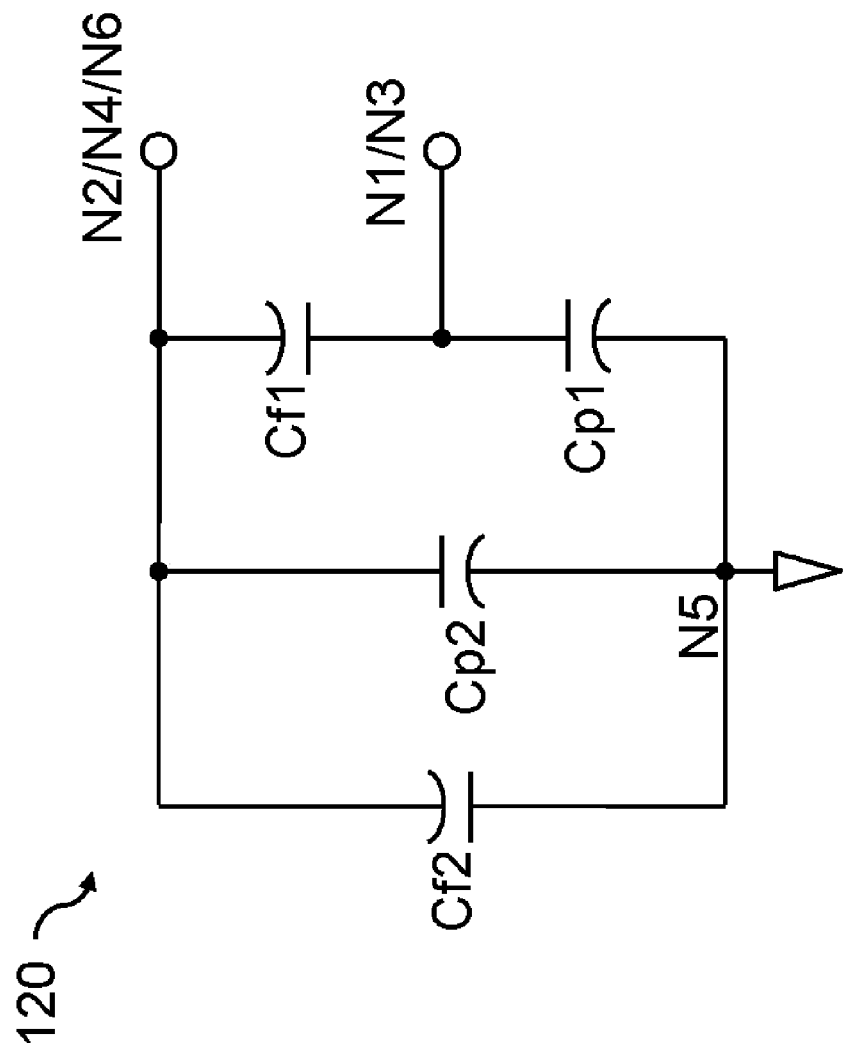
FIG. 6 is an explanatory diagram of an embodiment of a second equivalent circuit of the pump unit shown in FIG. 4A in the first power-supply mode.

Furthermore, the second, fifth, sixth and seventh switches S2, S5, S6, S7 are on, in response to the working phases PH2 of the second clock CK2, so that the electrical connection relation of the power receiving end N0, the ground end GND, the positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5) and the negative electrode of the second flying capacitor Cf2 (Node N6) form a second equivalent circuit, as shown in FIG. 6.

Please referring to FIG. 6, during the working phases PH2 of the second clock CK2, the first flying capacitor Cf1 is positively coupled between the positive output end N1 and the negative output end N2, and the second flying capacitor Cf2 is reversely coupled between the negative output end N2 and the ground end GND. Explicitly, the positive electrode of the first flying capacitor Cf1 (Node N3) is coupled to the positive output end N1, and the negative electrode of the first flying capacitor Cf1 (Node N4) is coupled to the negative output end N2. The positive electrode of the second flying capacitor Cf2 (Node N5) is coupled to the ground end GND, and the negative electrode of the second flying capacitor Cf2 (Node N6) is coupled to the negative output end N2.

In the second equivalent circuit under the first power-supply mode, the voltage Vcf2 across the second flying capacitor Cf2 is reversely fallen into the second storage capacitor Cp2, and the voltage Vcf1 across the first flying capacitor Cf1 is changed into the terminal voltage of the positive output end N1 (i.e. the positive output voltage VPP) minus the terminal voltage of the negative output end N2 (i.e. the negative output voltage VEE).

Consequently, Formula 3 and Formula 4 are obtained.

$$Vcf1 = VPP - VEE \quad \text{Formula 3}$$

$$VEE = -Vcf2 \quad \text{Formula 4}$$

On the basis of Formulas 1~4, in the first power-supply mode, the positive output voltage VPP outputted via the positive output end N1 is ⅓ times of the source voltage, i.e. VDD/3, and the negative output voltage VEE outputted via the negative output end N2 is −⅓ times of the source voltage, i.e. −VDD/3, as Formula 5 and Formula 6 below.

$$VPP = VDD/3 \quad \text{Formula 5}$$

$$VEE = -VDD/3 \quad \text{Formula 6}$$

Additionally, when the charge pump circuit 100 supplies the power in the first power-supply mode, in response to the first clock and the second clock, the electrical connection relation of the power receiving end N0, the ground end GND, the positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5), and the negative electrode of the second flying capacitor Cf2 (Node N6) alternatively form the first equivalent circuit and the second equivalent circuit.

Please referring again to FIGS. 4A and 4B, in the second power-supply mode, the amplitude detector 124 controls the multiplexer 122a of the multiplex circuit 122 to transmit the first clock CK1 to the control ends of the first, third, fourth and eighth switches S1, S3, S4, S8. Meanwhile, the amplitude detector 124 controls the multiplexer 122b of the multiplex circuit 122 to transmit the second clock CK2 to the control ends of the fifth, sixth, seventh and ninth switches S5, S6, S7, S9. The control ends of the second, tenth and eleventh switches S2, S10, S11 do not receive any control signal, so that the second, tenth and eleventh switch S2, S10 S11 are off. Explicitly, in the second power-supply mode, the first switch S1 and the third to eighth switches S3-S8 operates, while the second, tenth and eleventh switches S2, S10, and S11 do not.

Therefore, the first, third, fourth and eighth switches S1, S3, S4, S8 are on, in response to the working phases PH1 of the first clock CK1, so that the electrical connection relation of the power receiving end N0, the ground end GND, positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5), and the negative electrode of the second flying capacitor Cf2 (Node N6) form the first equivalent circuit, as shown in FIGS. 5A and 5B.

Please referring to FIGS. 5A and 5B, during the working phases PH1 of the first clock CK1, the operation of the pump unit 120 in the second power-supply mode is the same as the first power-supply mode. Explicitly, during the working phases PH1 of the first clock CK1, the first equivalent circuit formed in the second power-supply mode is the same as the one formed in the first power-supply mode.

In the first equivalent circuit under the second power-supply mode, the voltage Vcf2 across the second flying capacitor Cf2 and the voltage Vcf1 across the first storage capacitor Cf1 are equivalent to the terminal voltage of the positive output end N1 (the positive output voltage VPP), and the voltage Vcf1 across the first flying capacitor Cf1 is the source voltage VDD minus the terminal voltage of the positive output end N1 (the positive output voltage VPP). Meanwhile, the second storage capacitor Cp2 is floating connected between the negative output end N2 and the ground end GND. Consequently, Formula 1 and Formula 2 mentioned previously are obtained.

Furthermore, the fifth, sixth, seventh and ninth switches S5, S6, S7, S9 are on in response to the working phases PH2 of the second clock CK2, so that the electrical connection relation of the power receiving end N0, the ground end GND, the positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5), and the negative electrode of the second flying capacitor Cf2 (Node N6) form the second equivalent circuit, as shown in FIGS. 7A and 7B.

Please referring to FIGS. 7A and 7B, during the working phases PH2 of the second clock CK2, both the first flying capacitor Cf1 and the second flying capacitor Cf2 are reversely coupled between the negative output end N2 and the ground end GND. Explicitly, the negative electrode of the first flying capacitor Cf1 (Node N4) is coupled to the negative output end N2, and the positive electrode of the first flying capacitor Cf1 (Node N3) is coupled to the ground end GND. The positive electrode of the second flying capacitor Cf2 (Node N5) is coupled to the ground end GND, and the negative electrode of the second flying capacitor Cf2 (Node N6) is coupled to the negative output end N2.

In the second equivalent circuit under the second power-supply mode, the voltage Vcf1 across the first flying capacitor Cf1 and the voltage Vcf2 across the second flying capacitor Cf2 are reversely fallen into the second storage capacitor Cp2. In addition, the voltage Vcp1 across the first storage capacitor Cp1 is equivalent to the terminal voltage of the positive output end N1 (the positive output voltage VPP).

Consequently, Formula 7 is obtained.

$$VEE = -Vcf1 = -Vcf2 \qquad \text{Formula 7}$$

On the basis of Formula 1, Formula 2 and Formula 7, in the second power-supply mode, the positive output voltage VPP outputted via the positive output end N1 is ½ times of the source voltage, i.e. VDD/2, and the negative output voltage VEE outputted via the negative output end N2 is −½ times of the source voltage, i.e. −VDD/2, as listed in Formula 8 and Formula 9.

$$VEE = -(VDD - VPP) = -VDD/2 \qquad \text{Formula 8}$$

$$VPP = -VEE = VDD/2 \qquad \text{Formula 9}$$

Similarly, when the charge pump circuit 100 supplies the power in the second power-supply mode, in response to the first clock and the second clock, the electrical connection relation of the nodes N0-N6, GND alternatively forms the first equivalent circuit and the second equivalent circuit. However, the second equivalent circuit under the second power-supply mode is different from the second equivalent circuit in the first power-supply mode.

Please referring again to FIGS. 4A and 4B, in the third power-supply mode, the amplitude detector 124 controls the multiplexer 122a of the multiplex circuit 122 to transmit the first clock CK1 to the control ends of the first, third, eighth, tenth and eleventh switches S1, S3, S8, S10, S11. Meanwhile, the amplitude detector 124 controls the multiplexer 122b of the multiplex circuit 122 to transmit the second clock CK2 to the control ends of the fifth, sixth, seventh, ninth and tenth switches S5, S6, S7, S9, S10. The control ends of switches S2, S4 do not receive any control signal, so that the second switch S2 and the fourth switch S4 are off.

Explicitly, in the third power-supply mode, the firth, third and fifth to eleventh switches S1, S3, S5-S11 operate, while the second and fourth switches S2, S4 do not operate.

Figures 8A, 8B:
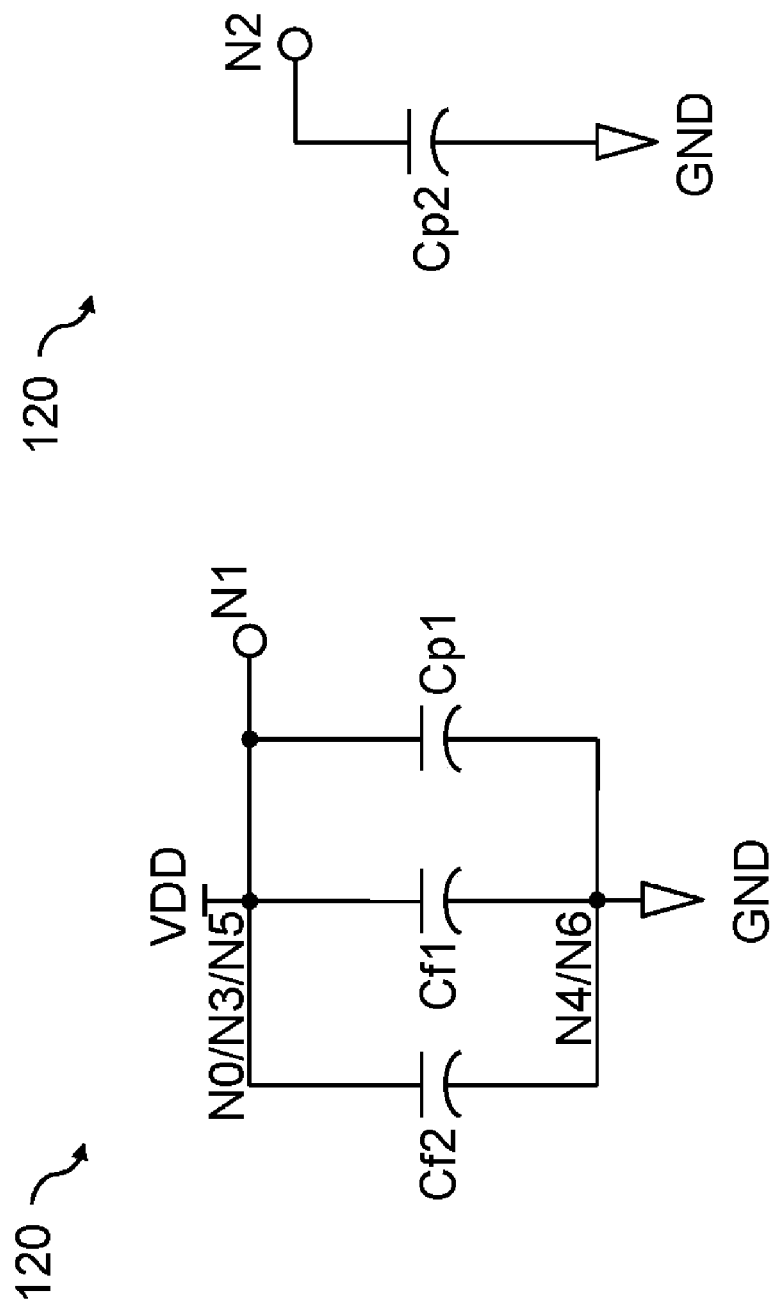
FIG. 8A and FIG. 8B are explanatory diagrams of an embodiment of a first equivalent circuit of the pump unit shown in FIG. 4A in a third power-supply mode.

Therefore, the first, third, eighth, tenth and eleventh switches S1, S3, S8, S10, S11 are on, in response to the working phases PH1 of the first clock CK1, so that the electrical connection relation of the power receiving end N0, the ground end GND, the positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5), and the negative electrode of the second flying capacitor Cf2 (Node N6) form the first equivalent circuit, as shown in FIGS. 8A and 8B.

Please referring to FIGS. 8A and 8B, during the working phases PH1 of the first clock CK1, both the first flying capacitor Cf1 and the second flying capacitor Cf2 are positively coupled between the power receiving end N0 and the ground end GND, and also positively coupled between the positive output end N1 and the ground end GND. Explicitly, the positive electrode of the first flying capacitor Cf1 (Node N3) is coupled to the power receiving end N0 and the positive output end N1, and the negative electrode of the first flying capacitor Cf1 (Node N4) is coupled to the ground end GND. The positive electrode of the second flying capacitor Cf2 (Node N5) is coupled to the power receiving end N0 and the positive output end N1, and the negative electrode of the second flying capacitor Cf2 (Node N6) is coupled to the ground end GND. In the meantime, the negative output end N2 is only directly coupled to the second storage capacitor Cp2 toward the inside of the charge pump circuit 100. That is, among the power receiving end N0, the ground end GND, the positive output end N1, the first storage capacitor Cp1, the second a storage capacitor Cp2, the first flying capacitor Cf1, the second flying capacitor Cf2 and the first to eleventh switches S1-S11, only the second storage capacitor Cp2 is directly coupled to the negative output end N2.

In the first equivalent circuit under the third power-supply mode, the source voltage VDD charges the first flying capacitor Cf1, second flying capacitor Cf2 and the first storage capacitor Cp1, and the second storage capacitor Cp2 is floating connected between the negative output end N2 and the ground end GND.

Consequently, Formula 10 is obtained.

$$VDD = Vcf1 = Vcf2 \qquad \text{Formula 10}$$

Additionally, the fifth, sixth, seventh, ninth and tenth switches S5, S6, S7, S9, S10 are on, in response to the working phases PH2 of the second clock CK2, so that the electrical connection relation of the power receiving end N0, the ground end GND, the positive output end N1, the negative output end N2, the positive electrode of the first flying capacitor Cf1 (Node N3), the negative electrode of the first flying capacitor Cf1 (Node N4), the positive electrode of the second flying capacitor Cf2 (Node N5), and the negative electrode of the second flying capacitor Cf2 (Node N6) form the second equivalent circuit, as shown in FIGS. 9A and 9B.

Please referring to FIGS. 9A and 9B, during the working phases PH1 of the first clock CK1, both the first flying capacitor Cf1 and the second flying capacitor Cf2 are reversely coupled between the negative output end N2 and the ground end GND. Explicitly, the negative electrode of the first flying capacitor Cf1 (Node N4) is coupled to the negative output end N2, and the positive electrode of the first flying capacitor Cf1 (Node N3) is coupled to the ground end GND. The negative electrode of the second flying capacitor Cf2 (Node N6) is coupled to the negative output end N2, and the positive electrode of the second flying capacitor Cf2 (Node N5) is coupled to the ground end GND. Furthermore, the power receiving end N0 is coupled to the positive output end N1.

In the second equivalent circuit under the third power-supply mode, the voltage Vcf1 across the first flying capacitor Cf1 and the voltage Vcf2 across the second flying capacitor Cf2 are reversely fallen into the second storage capacitor Cp2, and the voltage Vcp1 across the first storage capacitor Cp1 is equivalent to the source voltage VDD. Explicitly, the terminal voltage of the positive output end N1 (the positive output voltage VPP) is equivalent to the source voltage VDD.

Consequently, Formula 11 and Formula 12 are obtained.

$$VPP=+VDD \quad \text{Formula 11}$$

$$VEE=-Vcf1=-Vcf2 \quad \text{Formula 12}$$

On the basis of Formula 10, Formula 11 and Formula 12, in the third power-supply mode, the positive output voltage VPP outputted via the positive output end N1 is 1 time of the source voltage, i.e. +VDD, and the negative output voltage VEE output at the negative output end N2 is −1 time of the source voltage, i.e. −VDD, as shown in Formula 11 and Formula 13.

$$VEE=-VDD \quad \text{Formula 13}$$

Similarly, when the charge pump circuit 100 supplies the power in the third power-supply mode, in response to the first clock and the second clock, the electrical connection relation of the nodes N0-N6, GND alternatively forms the first equivalent circuit and the second equivalent circuit. However, the first equivalent circuit under the third power-supply mode is different from the first equivalent circuits under the first power-supply mode and the second power-supply mode. Also, the second equivalent circuit under the third power-supply mode is different from the second equivalent circuits under the first power-supply mode and the second power-supply mode.

Figure 10:
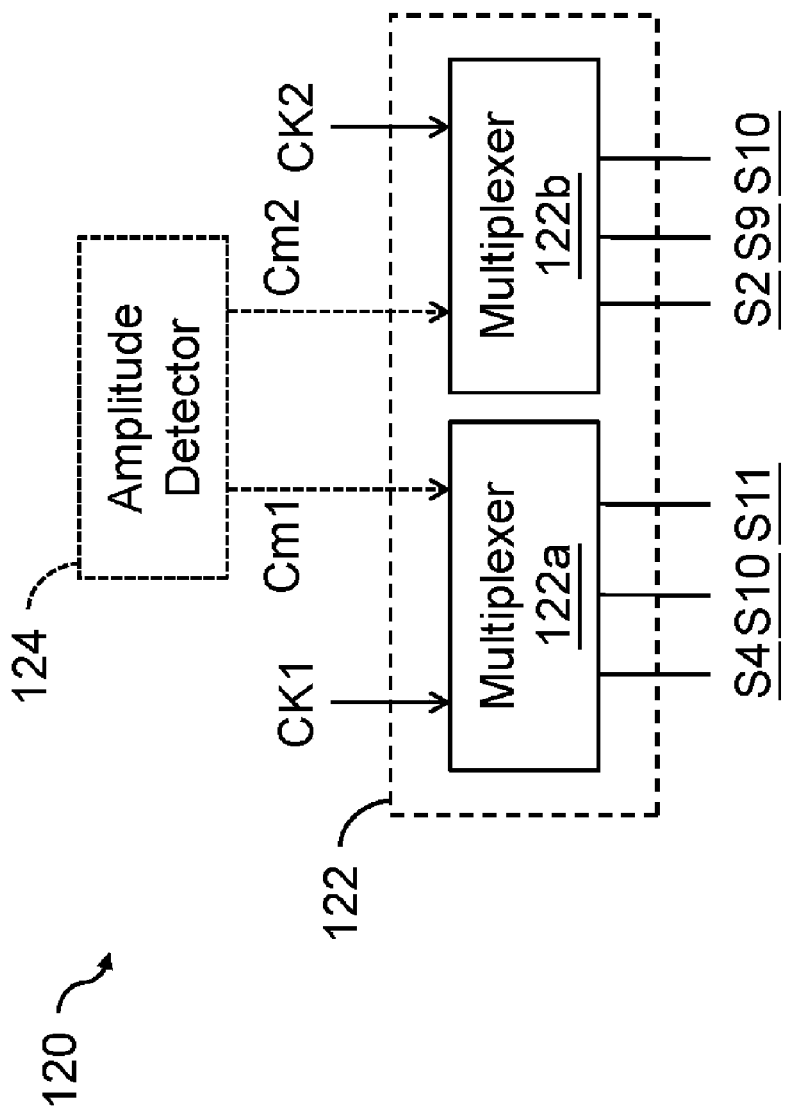
FIG. 10 is an explanatory diagram of an embodiment of a multiplex circuit in accordance with the invention.

Additionally, under all three power-supply modes, the first, third and eighth switches S1, S3, S8 are all controlled by the first clock CK1. Therefore, in another embodiment, the control ends of the first, third and eighth switches S1, S3, S8 do not receives the first clock CK1 via the multiplex circuit 122, instead, the control ends of the first, third and eighth switches S1, S3, S8 are directly coupled to the signal generating unit 140 to receive the first clock CK1. However, the control ends of the fourth, tenth and eleventh switches S4, S10, S11 receive the first clock CK1 via the multiplex circuit 122 according to the selected power-supply mode, as shown in FIG. 10.

Similarly, under the three power-supply modes, the fifth, sixth and seventh switches S5, S6, S7 are all controlled by the second clock CK2. Therefore, in another embodiment, the control ends of the fifth, sixth and seventh switches S5, S6, S7 do not receive the second clock CK2 via the multiplex circuit 122, instead the control ends of the fifth, sixth and seventh switches S5, S6, S7 are directly coupled to the signal generating unit 140 to receive the second clock CK2. However, the control ends of the second, ninth and tenth switches S2, S9, S10 receive the second clock CK2 via the multiplex circuit 122 according to the selected power-supply mode.

Figure 11:
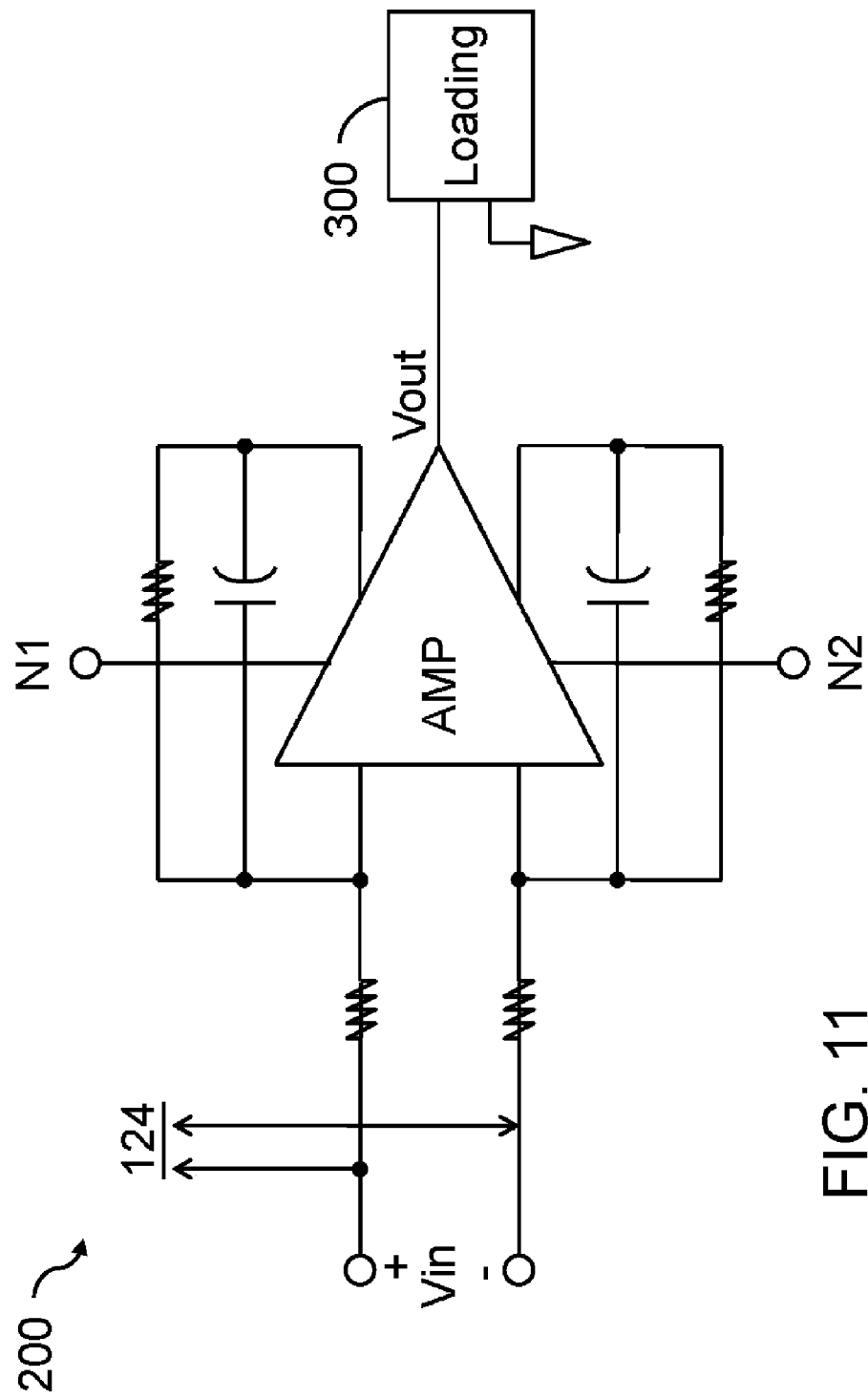
FIG. 11 is an explanatory diagram of an embodiment of a driving device in accordance with the invention.

Please referring to FIGS. 2, 4B and 11, in an application of a driving device, in some embodiments, the driving device includes a charge pump circuit 100 and an amplifier circuit 200. Here, the post-stage circuit mentioned previously is the amplifier circuit 200.

The amplifier circuit 200 mainly includes an amplifier AMP.

The amplifier AMP includes two input ends, an output end, and two power ends.

The output end of the amplifier AMP is coupled to a loading 300. For example, the loading 300 is a headphone, but not limited thereto.

The positive output end N1 and the negative output end N2 of the charge pump circuit 100 are coupled to the two power ends of the amplifier AMP, respectively. The positive output voltage VPP and the negative output voltage VEE outputted via the positive output end N1 and the negative output end N2 are applied to the two power ends of the amplifier AMP, respectively, and the positive output voltage VPP and the negative output voltage VEE act as the power required by the amplifier AMP in operation.

Under the power supplied by the charge pump circuit 100, the input signal Vin received by the amplifier circuit 200 is inputted into the input end of the amplifier AMP via two resistors. The amplifier AMP performs a signal processing on the received signal Vin, and then generates and outputs an output signal Vout to the loading 300 through the output end of the amplifier AMP.

The amplitude detector 124 of the charge pump circuit 100 is electrically connected to the input and/or output ends of the amplifier AMP, and correspondingly detects the input signals Vin and/or output signals Vout of the amplifier AMP.

Taking the detection of the input signal Vin as an example, the amplitude detector 124 is electrically connected to the input end of the amplifier AMP.

In the meantime, the amplitude detector 124 detects the amplitude of the input signal Vin inputted into the amplifier AMP.

During a predetermined time, when the amplitude detector 124 detects the amplitude of the input signal Vin is higher than a first threshold and is smaller or equals to a second threshold, the amplitude detector 124 controls the pump unit 120 to perform under the second power-supply mode, so as to apply the positive output voltage VPP and the negative output voltage VEE with respectively +½ and −½ times of the source voltage VDD to the power ends of the amplifier AMP.

When the amplitude detector 124 detects the amplitude of the input signal Vin is higher than the second threshold, the amplitude detector 124 controls the pump unit 120 to perform under the third power-supply mode, so as to apply the positive output voltage VPP and the negative output voltage VEE with respectively +1 and −1 times of the source voltage VDD to the power ends of the amplifier AMP.

When the amplitude detector 124 detects the amplitude of the input signal Vin is smaller or equals to the first threshold, the amplitude detector 124 controls the pump unit 120 to perform under the first power-supply mode, so as to apply the positive output voltage VPP and the negative output voltage VEE with respectively +⅓ and −⅓ times of the source voltage VDD to the power ends of the amplifier AMP.

Consequently, the positive output voltage VPP and the negative output voltage VEE are able to be adjusted dynamically according to the amplitude of the input signal Vin.

Take the driving device of the headphone as an example. Generally the output signals of the volume that human ears can bare is mostly within ±½ VDD powering the amplifier. In fact, the headphone usually has the applications with a long-period mute mode or a smaller volume output. In such applications, the charge pump circuit 100 according to the some embodiments of the invention can provide the power of ±⅓ VDD lower than the usual power required by the amplifier, i.e. ±½ VDD, thereby improving the power consuming efficiency greatly.

Corresponding to the charge pump circuit, a power-supply method for dynamically adjusting output voltage includes receiving a source voltage, selecting one of a first power-supply mode, a second power-supply mode and a third power-supply mode with different power conversion efficiencies according to an amplitude of an input signal, and controlling at least a connection relation according to a first clock and a second clock with non-overlapping working phases, to convert the source voltage into a positive output voltage and a negative output voltage corresponding to the selected power-supply mode, thereby powering a post-stage circuit that receives the input signal.

Please note that the above embodiments take two clock with non-overlapped working phases (the first clock and the second clock), two flying capacitors (the first flying capacitor and the second flying capacitor), two storage capacitors (the first storage capacitor and second storage capacitor), and multiple switches as examples, but the number of the elements should not be considered as general limitations to the disclosure.

As above, a charge pump circuit and a power-supply method for dynamically adjusting output voltage according to the embodiments of the invention is related to dynamically adjusting the output voltages corresponding to the operating status of the target circuit (e.g. the post-stage circuit), that is powered with the output voltages. During the adjustments, the charge pump circuit is able to adjust the positive output voltage and the negative output voltage at the same time to reduce the consumed power. Additionally, when the target circuit works, only one of the two additional capacitors (e.g. the first and the second storage capacitor) is discharged at the same time, so the other does not have any charge loss. Additionally, based on such charge pump framework, the two additional capacitors are able to conduct charge sharing with each other to reduce power consuming. Furthermore, the positive output voltage and the negative output voltage are adjustable according to the input or output signal of the target circuit, so as to switch into a low power-supply mode when needing the low output voltages and switch into a high power-supply mode when needing the high output voltages, thereby saving the power. Since three levels of power-supply modes are provided, the power consuming efficiency is able to be improved greatly.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A charge pump circuit, comprising:
    a power receiving end, for receiving a source voltage;
    a ground end;
    a positive output end, for outputting a positive output voltage;
    a negative output end, for outputting a negative output voltage;
    a first storage capacitor, coupled between the positive output end and the ground end;
    a second storage capacitor, coupled between the negative output end and the ground end;
    a first flying capacitor;
    a second flying capacitor;
    a pump unit, for controlling at least a connection relation of the first flying capacitor, the second flying capacitor, the first storage capacitor, and the second storage capacitor according to a first clock and a second clock with non-overlapping working phases, to convert the source voltage into the positive output voltage and the negative output voltage, thereby providing one of a first power-supply mode, a second power-supply mode and a third power-supply mode with different power conversion efficiencies; and
    an amplitude detector, for detecting an amplitude of an input signal or an output signal of a post-stage circuit powered with the positive output voltage and the negative output voltage, so as to select one of the three power-supply modes of the pump unit;
        wherein the amplitude detector selects the first power-supply mode when the amplitude is smaller than a first threshold, the amplitude detector selects the second power-supply mode when the amplitude is higher than the first threshold and smaller than a second threshold, and the amplitude detector selects the third power-supply mode when the amplitude is higher than the second threshold.

2. The charge pump circuit of claim 1, wherein the positive output voltage is one third of the source voltage in the first power-supply mode, the positive output voltage is half of the source voltage in the second power-supply mode, and the positive output voltage is exactly the source voltage in the third power-supply mode.

3. The charge pump circuit of claim 1, wherein the pump unit comprises a plurality of switches for switching according to the first clock and the second clock, so as to perform the one power-supply mode, and the switches comprise:
    a first switch, coupled between the power receiving end and a positive electrode of the first flying capacitor;
    a second switch, coupled between the positive output end and a positive electrode of the first flying capacitor;
    a third switch, coupled between the positive output end and a positive electrode of the second flying capacitor;
    a fourth switch, coupled between the positive output end and a negative electrode of the first flying capacitor;
    a fifth switch, coupled between the ground end and a positive electrode of the second flying capacitor;
    a sixth switch, coupled between the negative output end and a negative electrode of the first flying capacitor;
    a seventh switch, coupled between the negative output end and a negative electrode of the second flying capacitor;
    a eighth switch, coupled between the ground end and a negative electrode of the second flying capacitor;
    a ninth switch, coupled between the ground end and a positive electrode of the first flying capacitor;

a tenth switch, coupled between the power receiving end and the positive output end; and a eleventh switch, coupled between the ground end and a negative electrode of the first flying capacitor.

4. The charge pump circuit of claim 3, wherein in the first power-supply mode, the first switch, the third switch, the fourth switch and the eighth switch are on in response to the working phase of the first clock, and the second switch, the fifth switch, the sixth switch and the seventh switch are on in response to the working phase of the second clock.

5. The charge pump circuit of claim 3, wherein in the second power-supply mode, the first switch, the third switch, the fourth switch and the eighth switch are on in response to the working phase of the first clock, and the fifth switch, the sixth switch, the seventh switch and the ninth switch are on in response to the working phase of the second clock.

6. The charge pump circuit of claim 3, wherein in the third power-supply mode, the first switch, the third switch, the eighth switch, the tenth switch and the eleventh switch are on in response to the working phase of the first clock, and the fifth switch, the sixth switch, the seventh switch, the ninth switch and the tenth switch are on in response to the working phase of the second clock.

7. A power-supply method for dynamically adjusting output voltage, comprising:

receiving a source voltage;

selecting one of a first power-supply mode, a second power-supply mode and a third power-supply mode with different power conversion efficiencies according to an amplitude of an input signal; and controlling at least a connection relation according to a first clock and a second clock with non-overlapping working phases, to convert the source voltage into a positive output voltage and a negative output voltage corresponding to the selected power-supply mode for powering a post-stage circuit received the input signal, wherein the selecting step comprises:

selecting the first power-supply mode when the amplitude is smaller than a first threshold;

selecting the second power-supply mode when the amplitude is higher than the first threshold and smaller than a second threshold; and selecting the third power-supply mode when the amplitude is higher than the second threshold.

8. The power-supply method of claim 7, wherein the connecting relation of a first flying capacitor, a second flying capacitor, a first storage capacitor, and a second storage capacitor is controlled according to the first clock and the second clock control, thereby converting the source voltage into the positive output voltage and the negative output voltage corresponding to the selected power-supply mode.

9. The power-supply method of claim 8, wherein the positive output voltage is one third of the source voltage when the first power-supply mode is selected, the positive output voltage is half of the source voltage when the second power-supply mode is selected, and the positive output voltage is exactly the source voltage when the third power-supply mode is selected.

10. The power-supply method of claim 8, wherein when the first power-supply mode is selected, a controlling step comprises:

in response to the working phase of the first clock, connecting the source voltage to a positive electrode of the first flying capacitor, connecting a positive output end outputting the positive output voltage to a positive electrode of the second flying capacitor and a negative electrode of the first flying capacitor, and grounding a negative electrode of the second flying capacitor; and in response to the working phase of the second clock, connecting the positive output end to a positive electrode of the first flying capacitor, grounding a positive electrode of the second flying capacitor, and connecting a negative output end outputting the negative output voltage to a negative electrode of the first flying capacitor and a negative electrode of the second flying capacitor.

11. The power-supply method of claim 8, wherein when the second power-supply mode is selected, a controlling step comprises:

in response to the working phase of the first clock, connecting the source voltage to a positive electrode of the first flying capacitor, connecting a positive output end outputting the positive output voltage to a positive electrode of the second flying capacitor and a negative electrode of the first flying capacitor, and grounding a negative electrode of the second flying capacitor; and in response to the working phase of the second clock, grounding a positive electrode of the second flying capacitor and a positive electrode of the first flying capacitor, connecting a negative output end outputting the negative output voltage to a negative electrode of the first flying capacitor and a negative electrode of the second flying capacitor.

12. The power-supply method of claim 8, wherein the third power-supply mode is selected, a controlling step comprises:

in response to the working phase of the first clock, connecting the source voltage to a positive electrode of the first flying capacitor, connecting a positive output end outputting the positive output voltage to a positive electrode of the second flying capacitor and the source voltage, and grounding a negative electrode of the second flying capacitor and a negative electrode of the first flying capacitor; and in response to the working phase of the second clock, grounding a positive electrode of the second flying capacitor and a positive electrode of the first flying capacitor, connecting a negative output end outputting the negative output voltage to a negative electrode of the first flying capacitor and a negative electrode of the second flying capacitor, and connecting the source voltage to the positive output end.

* * * * *